United States Patent

Esser

[11] Patent Number: 5,984,374
[45] Date of Patent: Nov. 16, 1999

[54] PIPE BEND

[75] Inventor: Alexander Esser, Warstein, Germany

[73] Assignee: Esser-Werke GmbH, Warstein, Germany

[21] Appl. No.: 09/130,352

[22] Filed: Aug. 13, 1998

[30] Foreign Application Priority Data

Aug. 20, 1997 [DE] Germany ............................ 197 36 055

[51] Int. Cl.$^6$ ............................................................. F16L 43/00
[52] U.S. Cl. ............................................ 285/179; 285/407
[58] Field of Search ............................. 285/179, 179.1, 285/180, 181, 407; 138/177, DIG. 11

[56] References Cited

U.S. PATENT DOCUMENTS

| | | | |
|---|---|---|---|
| 567,231 | 9/1896 | Glauber | 285/179 X |
| 592,820 | 11/1897 | Normoyle | 285/179 |
| 1,960,557 | 5/1934 | Snyder | 285/179 |
| 5,718,461 | 2/1998 | Esser | 285/179 |

FOREIGN PATENT DOCUMENTS

| | | | |
|---|---|---|---|
| 298398 | 6/1917 | Germany | 285/179 |
| 3814034 | 11/1989 | Germany | 289/179 |

*Primary Examiner*—Dave W. Arola
*Attorney, Agent, or Firm*—Friedrich Kueffner

[57] ABSTRACT

A pipe bend for integration in a pipeline for conveying concrete has coupling flanges at the ends thereof which radially project beyond the outer surface of the pipe bend. The internal flow cross-section of the pipe bend is dimensioned essentially equal in any length portion of the pipe bend between the coupling flanges. The wall thickness of the radially outer bend portion facing away from the center of curvature increases in the conveying direction, wherein the internal flow cross-section has a ramp-like step in the radially outer bend portion at a distance from the end face of the pipe bend at the exit side corresponding approximately to twice the actual width of the coupling flange on the exit side.

3 Claims, 2 Drawing Sheets

PIPE BEND

BACKGROUND OF THE INVENTION

1. Field of the Invention

The present invention relates to a pipe bend for integration in a pipeline for conveying concrete.

2. Description of the Related Art

As a result of findings obtained in practice, it is an undisputable fact that the wear in such a pipe bend increases in the conveying direction from the entry side toward the exit side in the radially outer bend portion facing away from the center of curvature of the pipe bend. A significant reason for this fact is a segregation of the concrete in solid components and water. This is because the centrifugal force causes the solid components to be compacted in the radially outer bend portion, while the water concentrates in the radially inner bend portion. This effect increases in the conveying direction up to the exit end of the pipe bend.

In order to counteract this specific wear effect, the wall thickness has in the past been increased in the radially outer bend portion of a pipe bend, wherein the wall thickness in the radially outer bend portion increases continuously in the direction toward the exit end. This made it possible to increase the service life of the pipe bend, however, this measure was not really satisfactory. The wear at the exit end of the pipe bend, particularly in the area of the coupling flange provided in this area, still was comparatively substantial.

SUMMARY OF THE INVENTION

Therefore, it is the primary object of the present invention, starting from the prior art discussed above, to provide a pipe bend for integration in a pipeline serving for conveying concrete, wherein the pipe bend has especially at the exit end which is subjected to wear to the greatest extent a wear resistance which essentially corresponds to the wear resistance at the end on the entry side.

In accordance with the present invention, the pipe bend has coupling flanges at the ends thereof which radially project beyond the outer surface of the pipe bend. The internal flow cross-section of the pipe bend is dimensioned essentially equal in any length portion of the pipe bend between the coupling flanges. The wall thickness of the radially outer bend portion facing away from the center of curvature increases in the conveying direction, wherein the internal flow cross-section has a ramp-like step in the radially outer bend portion at a distance from the end face of the pipe bend at the exit side corresponding approximately to twice the actual width of the coupling flange on the exit side.

The ramp-like step provided in the radially outer portion of the pipe bend according to the present invention has the effect that the solid components in the concrete as a result of their mass inertia maintain their direction when passing the step and travel almost in a straight line into the pipe arranged following the pipe bend. Only water reaches into the free space following the step, wherein the pressure of the water can drop in this free space.

Since the inner and outer dimensions for connecting a pipe bend to pipes and the pipes connected to the pipe bend especially at the exit side are standardized, the present invention makes it now possible that the wear resistance at the exit side of the pipe bend corresponds approximately to the wear resistance at the entry side. This significantly increases the service life of the pipe bend. In principle, this means that a pipe bend can be constructed with less weight because, with the throughput being equal, the wall thicknesses can be reduced and, thus, less material has to be used. A pipe bend having a lighter weight is very advantageous particularly when integrated in a pump mast used in connection with a motor vehicle.

The two coupling flanges at the ends of the pipe bend may be integrally connected or they may be components of flanges which are welded on.

In view of the fact that the internal flow cross-section of the pipe bend is to remain approximately equal over the entire length of the pipe bend, another feature of the present invention provides that the radially inner bend portion located opposite the ramp-like step is slightly curved in an S-shaped manner. This measure means that sharp transitions are avoided. In this connection, it must also be taken into consideration that the radially inner bend portion is only subjected to slight wear.

In accordance with a further development of the present invention, the radially outer bend portion of the pipe bend has at least one additional ramp-like step. A slight S-shaped curve again is located opposite this additional step or also any additional step.

Because of the mass inertia of the more solid components of the concrete, each step integrated in this manner in a pipe bend prevents a segregation of the water and the solid components with the result that the solid components are essentially thrown past and over the ramp and are conveyed in a straight line to the next following length portion of the pipe bend having a greater wall thickness.

In this connection, a useful embodiment of the present invention provides that in addition to the step at the exit side are provided two additional inner ramp-like steps which are distributed as much as possible in a uniform spacing in the conveying direction of the pipe bend.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
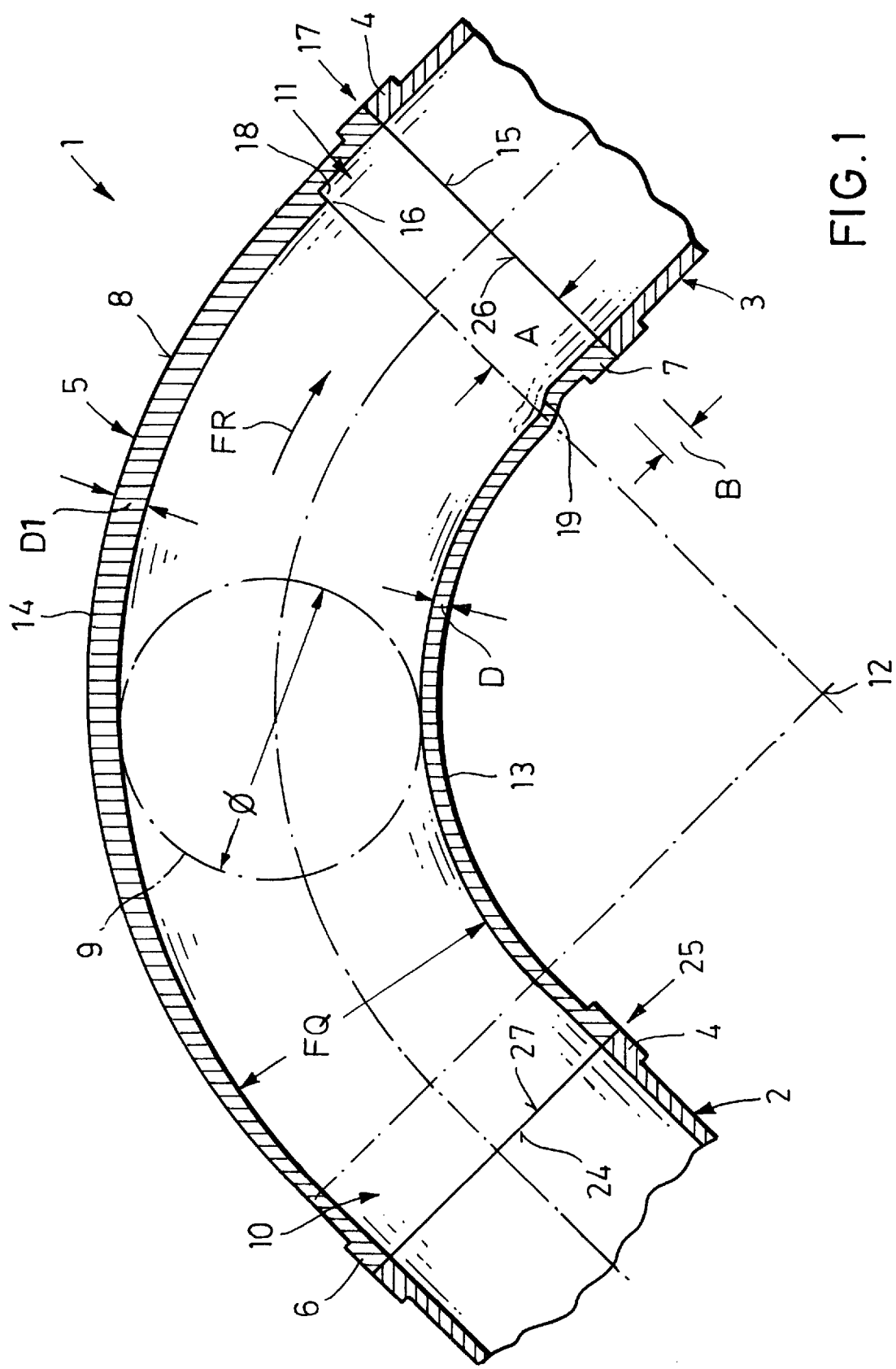
FIG. 1 is a sectional view of a pipe bend according to the present invention.

FIG. 1 shows a pipeline 1 as a component of a pump mast, not illustrated in detail, of a concrete pump installed on a motor vehicle.

A pipe bend 5 manufactured by a steel casting method is integrated in the pipe line 1 between two straight pipes 2, 3 which are provided with coupling flanges 4 and the ends thereof. The pipe bend 5 has at its ends integrally connected coupling flanges 6, 7 which radially protrude above the outer surface 8 of the pipe bend 5. These coupling flanges 6, 7 serve for the connection to the coupling flanges 4 of the adjacent pipes 2, 3. Used for this purpose are shell-shaped coupling rings, not illustrated in detail, usually provided with inner sealing elements and clamping units. While leaving coupling gaps 17, 25, the end faces 15 and 24 of the pipe bend 5 are butt-jointed to the end faces 16 and 17 of the pipes 3, 2.

As illustrated by a circle 9 in dash-dot lines, the internal flow cross-section FQ remains equal over the entire length of the pipe bend 5. In particular at the transition from the pipe 2 to the entry end 10 and the transition from the exit end 11 to the following pipe 3, no internal projections exist which could provide a resistance to the concrete flowing in the conveying direction FR.

While the wall thickness D of the radially inner bend portion 13 in relation to the center 12 of curvature of the pipe bend 5 remains essentially equal between the two coupling flanges 6, 7, the wall thickness Di uniformly increases in the radially outer bend portion 14 in the conveying direction FR starting at the coupling flange 6 at the entry side. At a distance A from the end face 15 of the pipe bend 5 at the exit side, which corresponds approximately to twice the axial width B of the coupling flange 7 at the exit side, the radially outer bend portion 14 has a ramp-like step 16 in the internal flow cross-section FQ. This internal step 16 has the effect that the concrete flowing in the conveying direction FR can no longer segregate as a result of the centrifugal force into water and solid components; rather, because of its mass inertia, the concrete travels in essentially the same consistency over the coupling gap 17 directly into the subsequent pipe 3. Merely the pressure of the water is allowed to drop in the half moon-shaped free space 18 following the step 16.

In order to maintain an essentially uniform internal flow cross-section FQ even in the area of the ramp-like step 16, the radially inner bend portion 13 located opposite the step 16 is provided with a S-shaped curve 19.

Figure 2:
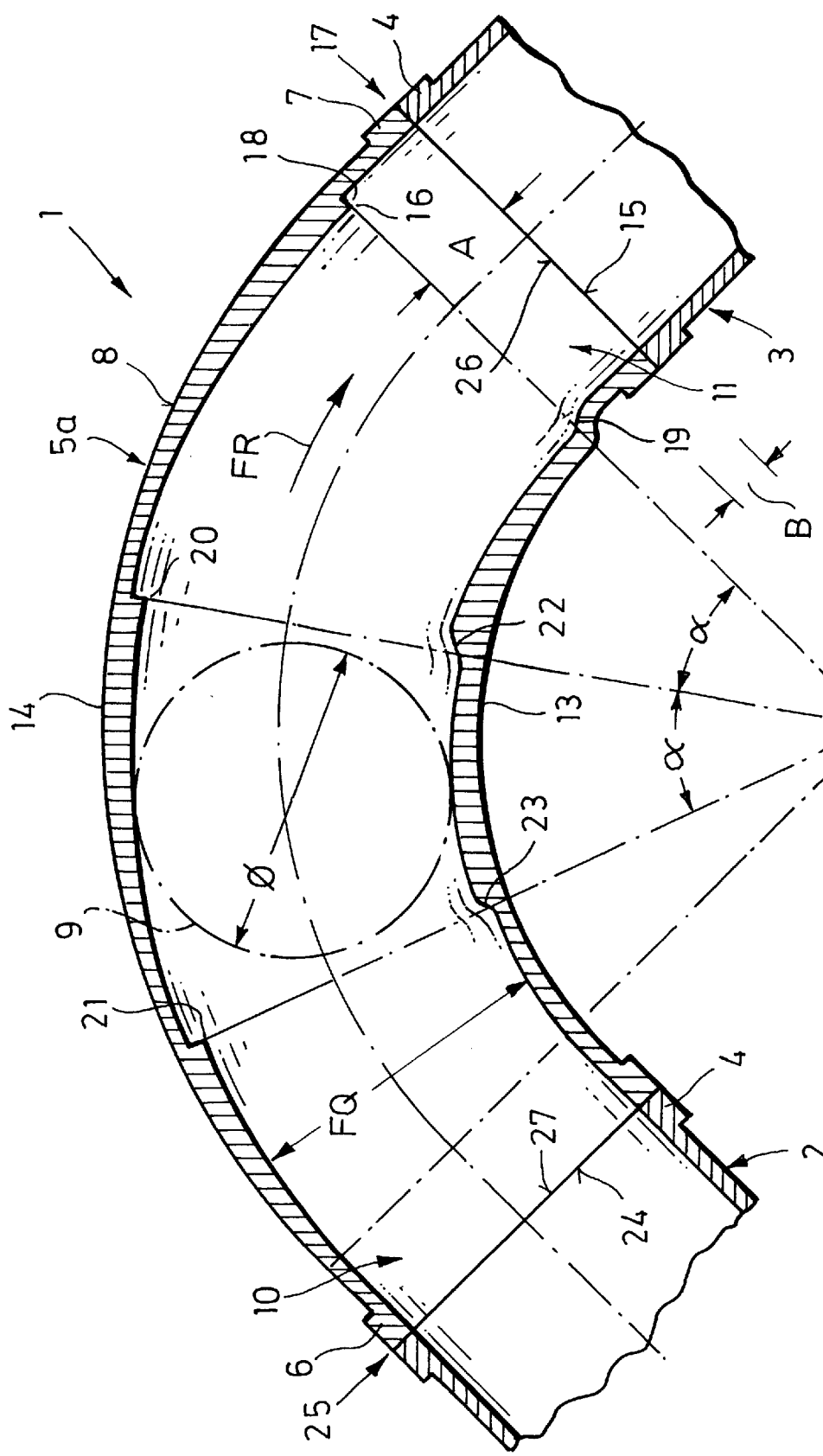
FIG. 2 is a sectional view of another embodiment of the pipe bend according to the present invention.

FIG. 2 of the drawing shows an embodiment in which a pipe bend 5a is integrated between two straight pipes 2,3 of a pipeline 1 in the form of a pump mast for a concrete pump installed on a motor vehicle.

This pipe bend 5a, which is also made by casting, has in addition to the ramp-like step 16 at a distance a from the end face 15 at the exit side already explained in connection with FIG. 1 two additional inner ramp-like steps 20, 21 which are arranged at an angle α of 35° relative to the subsequent step 16 or 20 in the conveying direction FR. S-shaped curves 22, 23 are also provided in the radially inner bend portion 13 opposite the steps 20, 21 in the internal flow cross-section FQ of the radially outer bend portion 14.

The illustration of FIG. 2 otherwise corresponds to that of FIG. 1, so that a further description of FIG. 2 is not necessary.

While specific embodiments of the invention have been shown and described in detail to illustrate the inventive principles, it will be understood that the invention may be embodied otherwise without departing from such principles.

I claim:

1. A pipe bend for integration in a pipeline for conveying concrete, the pipe bend having ends at an entry side and at an exit side, coupling flanges radially protruding above an outer surface of the pipe bend at the ends of the pipe bend, the pipe bend having an internal cross-section, the internal cross-section being essentially constant in any length portion between the coupling flanges, the pipe bend having a radially outer bend portion facing away from a center of curvature of the pipe bend, wherein the wall thickness of the radially outer bend portion increases in a conveying direction, and wherein the internal cross-section has a ramp-like step in the radially outer bend portion, said wall thickness increasing from said entry side to said ramp-like step, the ramp-like step being located at a distance from an end face of the pipe bend at the exit side of the pipe bend corresponding approximately to twice an axial width of the coupling flange at the exit side.

2. The pipe bend according to claim 1, wherein the pipe bend has a radially inner bend portion opposite the radially outer bend portion, and wherein the inner bend portion has a S-shaped curve located opposite the ramp-like step.

3. The pipe bend according to claim 2, wherein the radially outer bend portion has at least one additional ramp-like step in the conveying direction, and wherein a S-shaped curve is located in the radially inner bend portion opposite each ramp-like step.

* * * * *